(12) United States Patent  (10) Patent No.: US 7,478,995 B2
Louis et al.  (45) Date of Patent: Jan. 20, 2009

(54) DEVICE FOR LOCKING A STRUCTURE FOR SECURING A BLADE TO THE HUB OF A ROTORCRAFT ROTOR

(75) Inventors: Charles Louis, Aix En Provence (FR); Patrick Quesne, Ecouflant (FR)

(73) Assignees: Eurocopter, Marignane (FR); Artus, Avrille (FR)

( * ) Notice: Subject to any disclaimer, the term of this patent is extended or adjusted under 35 U.S.C. 154(b) by 560 days.

(21) Appl. No.: 11/359,439

(22) Filed: Feb. 23, 2006

(65) Prior Publication Data

US 2006/0193725 A1 Aug. 31, 2006

(30) Foreign Application Priority Data

Feb. 28, 2005 (FR) .................................. 05 01982

(51) Int. Cl.
B64C 11/28 (2006.01)
B64C 27/50 (2006.01)

(52) U.S. Cl. ..................................................... 416/143
(58) Field of Classification Search ................. 416/142, 416/143

See application file for complete search history.

(56) References Cited

U.S. PATENT DOCUMENTS 5,465,815 A * 11/1995 Ikegami ..................... 188/164
5,751,127 A * 5/1998 Austin et al. ................ 318/370
5,782,606 A 7/1998 Mondet et al.
5,951,251 A * 9/1999 Mondet et al. .............. 416/107

FOREIGN PATENT DOCUMENTS

DE 101 25 836 11/2002
DE 103 06 875 7/2004
WO WO 98/21807 5/1998

* cited by examiner

Primary Examiner—Edward Look
Assistant Examiner—Aaron R Eastman
(74) Attorney, Agent, or Firm—Young & Thompson

(57) ABSTRACT

A device for locking a holding structure for securing a foldable blade of a rotorcraft rotor to the hub of the rotor. The holding structure is hinged in pitch and in drag relative to the hub and the rotor includes, for the purpose of folding the blade, elements for locking the blade-holding structure in pitch and in drag, which device is remarkable in that the associated drive elements includes brake elements preventing it from turning in flight, in particular under the effect of vibration from the rotor.

10 Claims, 5 Drawing Sheets

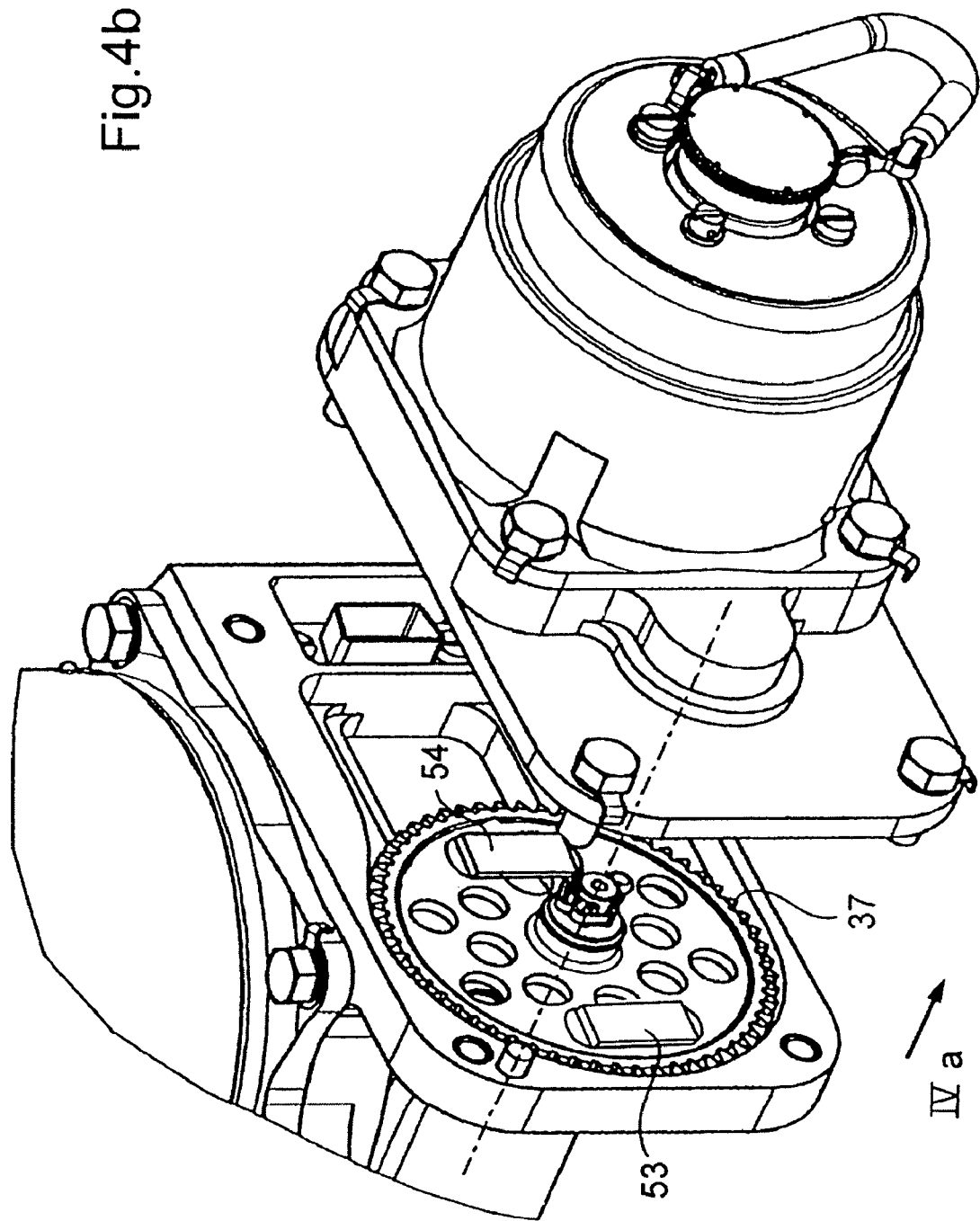

DEVICE FOR LOCKING A STRUCTURE FOR SECURING A BLADE TO THE HUB OF A ROTORCRAFT ROTOR

The present invention relates to a device for locking a holding structure for securing a blade to the hub of a rotorcraft rotor.

FIELD OF THE INVENTION

The technical field of the invention is that of designing and manufacturing rotorcraft.

The invention applies in particular to rotorcraft rotors fitted with foldable blades, and also to actuators for automatically deploying and folding such blades.

BACKGROUND OF THE INVENTION

U.S. Pat. No. 5,782,606 and French patent No. 2 742 726 describe a blade-folding device in which the root of the blade is secured to a folding fitting having two rotary bearings enabling the blade to pivot relative to the end of a sleeve providing a mechanical connection between the blade and the rotor hub. The rotor disclosed in those patents includes a plate pierced by as many cells as it has blades. Each sleeve for securing a blade to the hub comprises two arms forming a fork and is secured to the hub via a laminated spherical abutment secured to the arms of the sleeve, said resilient abutment enabling the sleeve—and the corresponding blade—to be hinged relative to the rotor hub about three pivot axes:

i) a hinge about a first axis that is substantially parallel to the longitudinal axis of the rotor shaft to enable the blade to be moved "in drag" relative to the hub;

ii) a hinge of the sleeve and the blade about a second axis that substantially coincides with the longitudinal axis of the blade to accommodate the variation in pitch (and incidence) that are required for the blade; and iii) a hinge about a third axis that is substantially perpendicular to the longitudinal axis of the rotor shaft, to enable the blade to perform flapping movements relative to the rotor hub.

In particular, when the hinge between the hub and the blade (and sleeve) is provided via a spherical abutment, these three hinge axes coincide at the geometrical center of the abutment.

The presence of these three degrees of freedom in rotation for the blades relative to the hub is necessary during rotation of the rotor, and in particular in flight, but when the rotor is stationary, it constitutes an impediment against folding the blades of the rotor.

Before folding the blade it is necessary to lock these three degrees of freedom so as to prevent them producing their effects. The flapping hinge is generally held stationary by a portion of the sleeve—or a "low"abutment secured thereto—moving under the effect of the weight of the blade and the associated sleeve to come into abutment against a complementary abutment integrated in the hub or secured thereto, and generally referred to as the reciprocating stop ring by the person skilled in the art.

It remains necessary to lock the sleeve in position relative to the hub about the drag and pitch hinge axes.

To this end, a locking device can be provided for a hinged holding structure (such as a sleeve) for securing a blade of a rotorcraft rotor to a hub of the rotor, which device comprises a lever arranged to cause said holding structure to pivot about the drag axis into a drag locking position in which said structure bears against a "drag" abutment secured to the hub. The lever can simultaneously cause the blade-holding structure (sleeve) to pivot about the pitch axis into a pitch locking position in which the structure bears against a "pitch" abutment connected to the hub.

Prior to folding the blades of the rotor, the lever can be operated, i.e. caused to move, by an electric actuator, such as a rotary motor, so as to act under the control of a unit for controlling the locking of the sleeve, to cause the position of the blade-holding structure to be locked automatically relative to the hub.

Such a locking device is described in particular in U.S. Pat. No. 5,951,251.

OBJECTS AND SUMMARY OF THE INVENTION

Under such conditions, it is essential for the system for locking the blade-holding sleeve never to be activated accidentally while the rotor is revolving, and in particular while in flight.

The invention satisfies this need.

Thus, according to the invention, there is provided a device for locking a holding structure for securing a blade of a rotorcraft rotor having foldable blades, which rotor comprises a hub, a plurality of blades, and a respective holding structure for securing each of the blades to the hub, said holding structures being hinged in pitch and in drag relative to the hub, the rotor also comprising respective locking means associated with each of the blade-holding structures and arranged to cause the pitch hinge of the blade-holding, structure to be locked relative to the hub, and also arranged to cause the drag hinge of the blade-holding structure to be locked relative to the hub, the locking means being suitable for being set into movement by a rotary electric actuator and a drive mechanism. The locking means is remarkable in that it further comprises brake means for the rotary electric actuator and/or the drive mechanism to prevent rotation of said actuator and of the drive mechanism, in particular under the effect of rotor vibration and in the absence of electricity being fed to the motor, and enabling the actuator and the drive mechanism to rotate when the actuator is powered; in addition, the drive mechanism is irreversible.

In particular, the mechanism may include a speed reducer comprising a wormscrew for driving a gearwheel.

In preferred embodiments of the invention:

the brake means act by the magnetic effect;

the brake means comprise a first magnet secured to a stationary part of the actuator or of the drive mechanism, and a second magnet secured to a moving part of the actuator or of the drive mechanism, the position of the first magnet on the stationary part and the position of the second magnet on the moving part being such that the first magnet and the second magnet can be brought to face each other during rotation of the actuator, and the polarities of these magnets being such that they attract each other when they are placed facing each other so as to produce braking torque when they are moved away from said facing position;

the brake means comprise at least two first magnets secured to a stationary part such as an actuator mounting flange, and include at least two second magnets secured to a moving part such as a gearwheel for enabling the rotary actuator to drive a lever for locking a hinged sleeve, the moving part extending—at least in part—so as to face the stationary part, the spacing between the first magnet corresponding to the spacing between the second magnet such that the brake torque produced by each of the at least two pairs of magnets are additive; and the drive mechanism enabling the actuator to drive the locking means includes a wormscrew speed reducer.

The irreversibility of the mechanism for enabling the actuator to drive the locking means serves to ensure that the forces acting on the locking members of the blade are not transmitted to the actuator.

BRIEF DESCRIPTION OF THE DRAWINGS

Other characteristics and advantages of the invention appear in the following description which show preferred embodiments of the invention without any limiting character and which refers to the accompanying drawings, in which:

FIG. 4b is an "exploded" perspective view corresponding to looking along arrow IVb of FIG. 4a, showing the electric motor that turns the locking and unlocking lever, and showing the positioning of the brake magnets on gearing driven by the electric motor and facing the flange of the motor.

MORE DETAILED DESCRIPTION

Figure 1:
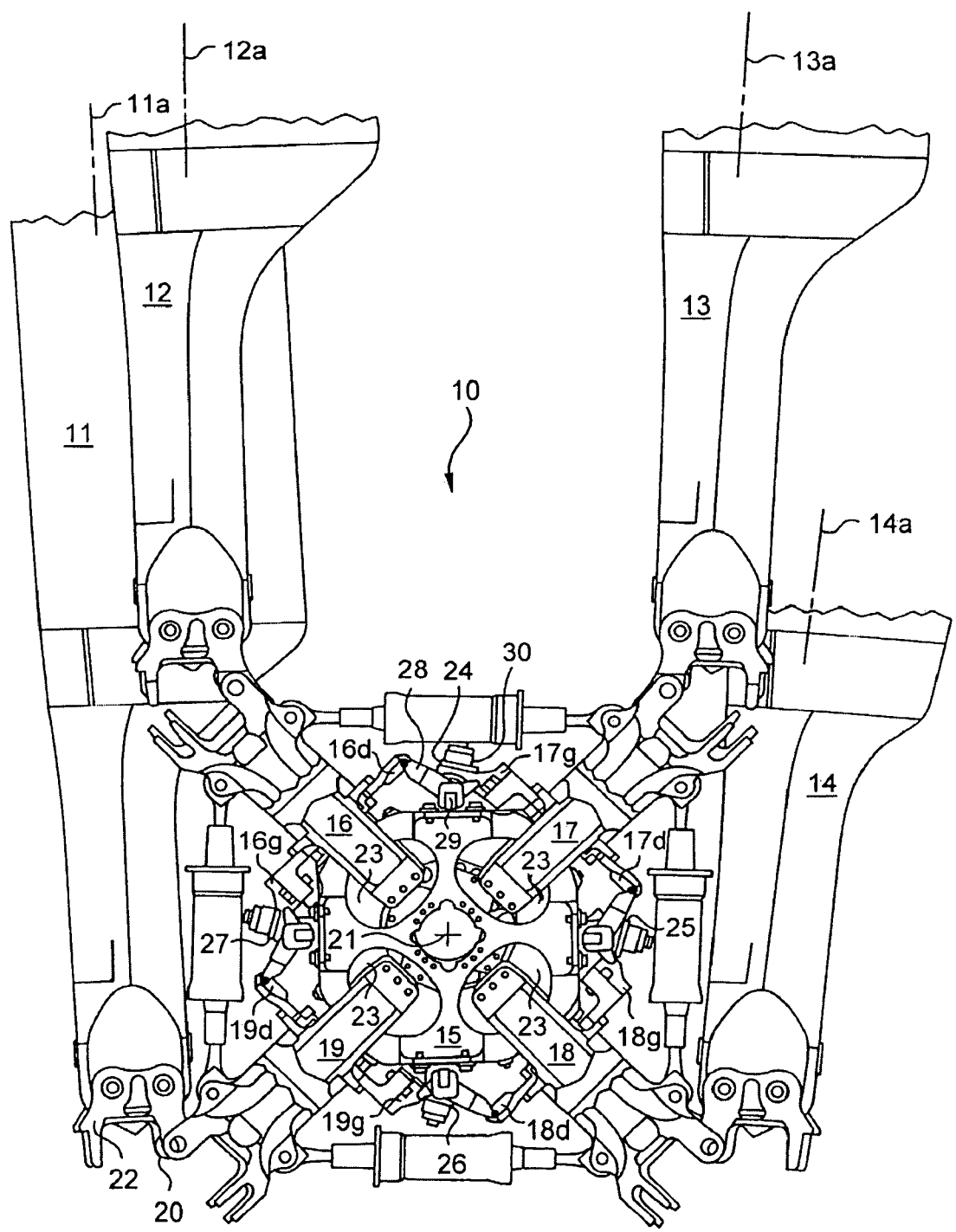
FIG. 1 is a diagrammatic plan view of a rotorcraft rotor of the invention comprising four folded blades and four actuators for locking in position sleeves that serve to secure the blades to the rotor hub.

With reference to FIG. 1, the rotor 10 comprises four blades—11 to 14—each secured to the hub 15 of the rotor via four respective sleeves 16 to 19.

While being folded, each blade (such as the blade referenced 11) is hinged by a bearing (reference 20) to the outer end of the corresponding sleeve (reference 19) via a folding fitting 22. In the folded position shown in FIG. 1, the respective longitudinal axes 11a to 14a of the blades 11 to 14 are substantially parallel and perpendicular to the axis of rotation 21 of the rotor 10.

Each of the sleeves is hinged relative to the hub plate 15 at its inner end via a spherical abutment (not shown in this figure) extending through a respective one of four cells 23 cut out in the plate 15.

Each sleeve has a left projection (16g to 19g respectively) presenting a blade-shaped portion, and a right projection (16d-19d respectively), also presenting a blade-shaped portion.

A sleeve-locking actuator 24 to 27 is secured to the hub plate 15 at its periphery, between each pair of two adjacent sleeves.

Figure 2:
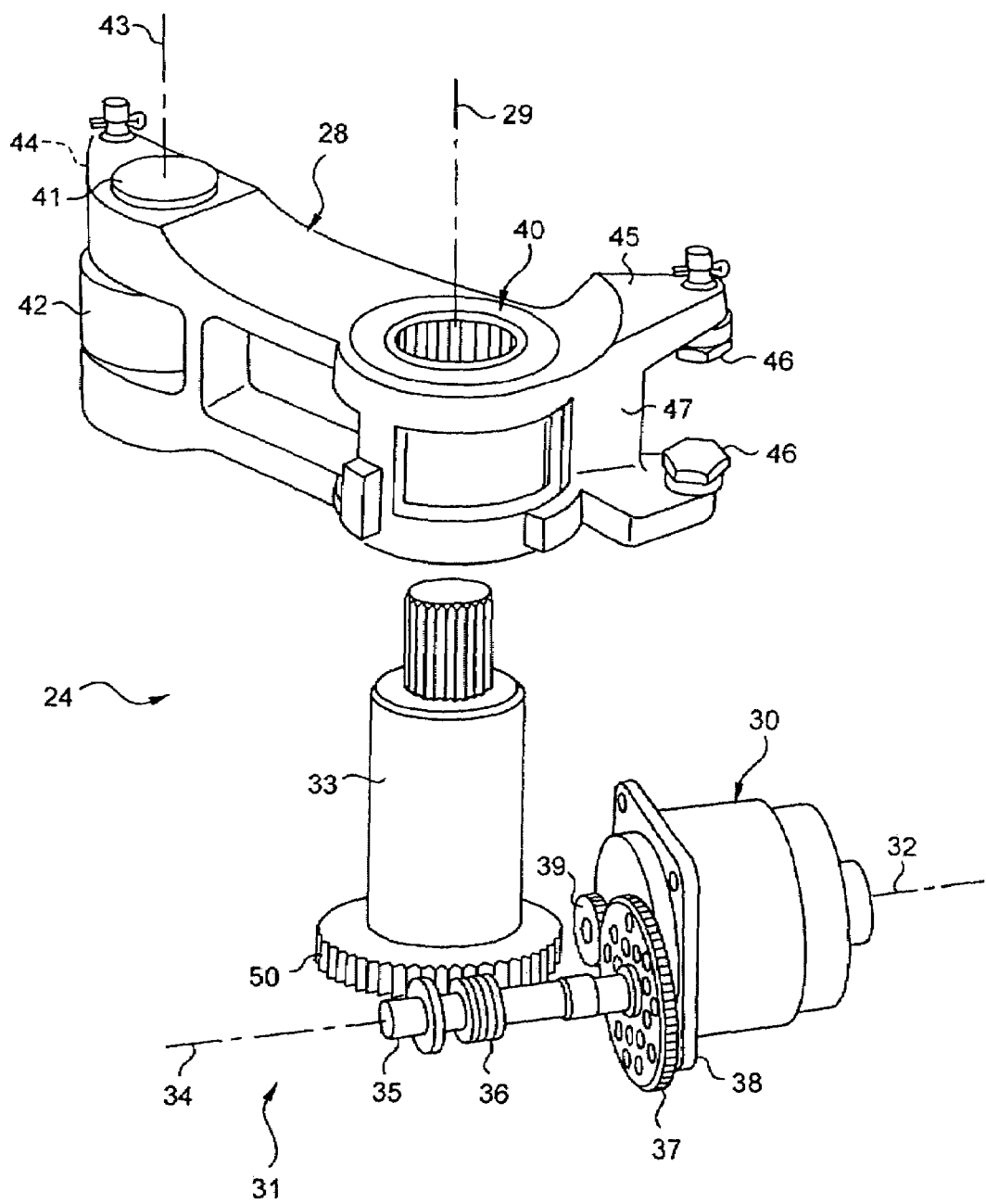
FIG. 2 is an "exploded" diagrammatic perspective view of a sleeve-locking lever of a device of the invention, together with the electric motor and the drive mechanism used for actuating the locking lever; four actuators identical to the actuator shown in FIG. 2 are secured to the FIG. 1 rotor hub.

Each of these four identical locking actuators, such as the actuator 24 in FIG. 2, comprises a lever 28 mounted to pivot relative to the plate 15 about a pivot axis 29 that is substantially parallel to the rotor axis 21. The locking lever 28 is caused to pivot by an electric motor 30 that rotates about an axis 32 and that drives the lever 28 via a stepdown gear mechanism 31.

The lever 28 presents a bend in its central portion and two opposite end portions 41 and 45. In its central portion, the lever 28 presents a fluted bore 40 of axis 29 receiving the end of a drive shaft 33 of the mechanism 31.

The end 45 of the lever 28 presents a slot 47 giving it a fork shape, carrying two facing abutments 46. This slot and these abutments co-operate with the left projection 17g of the corresponding sleeve 17 to cause the sleeve to be locked, and conversely to be unlocked. For this purpose, the slot 47 engages around, or disengages from, the projecting blade-shaped portion 17g, and the abutments 46 come to bear against said projection to cause and/or allow the sleeve to pivot about its pitch and drag hinge axes. This action of the lever 28 of the actuator 24 on the sleeve 17 is simultaneous with an action of the same lever 28 of the actuator 24 on the sleeve 16 taking place via the right projection 16d thereof, and by co-operation of said projection 16d with a wheel 42 and two abutments 44 (not shown in FIG. 2) similar to those described above for the projection 17g of the sleeve 17, and complementary thereto. Thus the locking (and conversely the unlocking) of a sleeve—such as the sleeve 17—is obtained by the simultaneous action of two levers driven respectively by two actuators—such as 24 and 25—disposed on either side of the sleeve 17.

Naturally, locking the degrees of freedom in pitch and drag requires each sleeve to be previously positioned at a predetermined pitch angle, e.g. having the value zero, so as to enable the movements of the two abutments 44 and of the wheel 42 to be coordinated with the right projection 16d and so as to enable the movements of the two abutments 46 to be coordinated with the left abutment 17g.

Figure 3A:
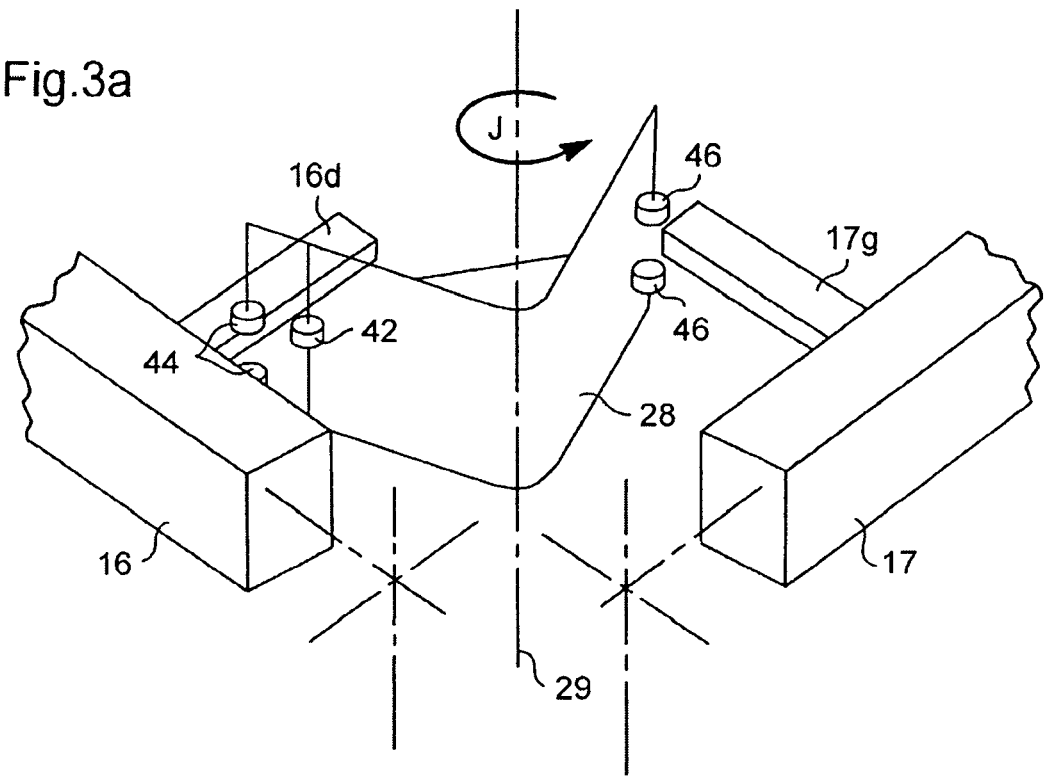
FIG. 3a is a diagrammatic view of two portions of two sleeves and the lever of the invention in the unlocked position (sleeves released to place the rotor in a flight situation)
Figure 3B:
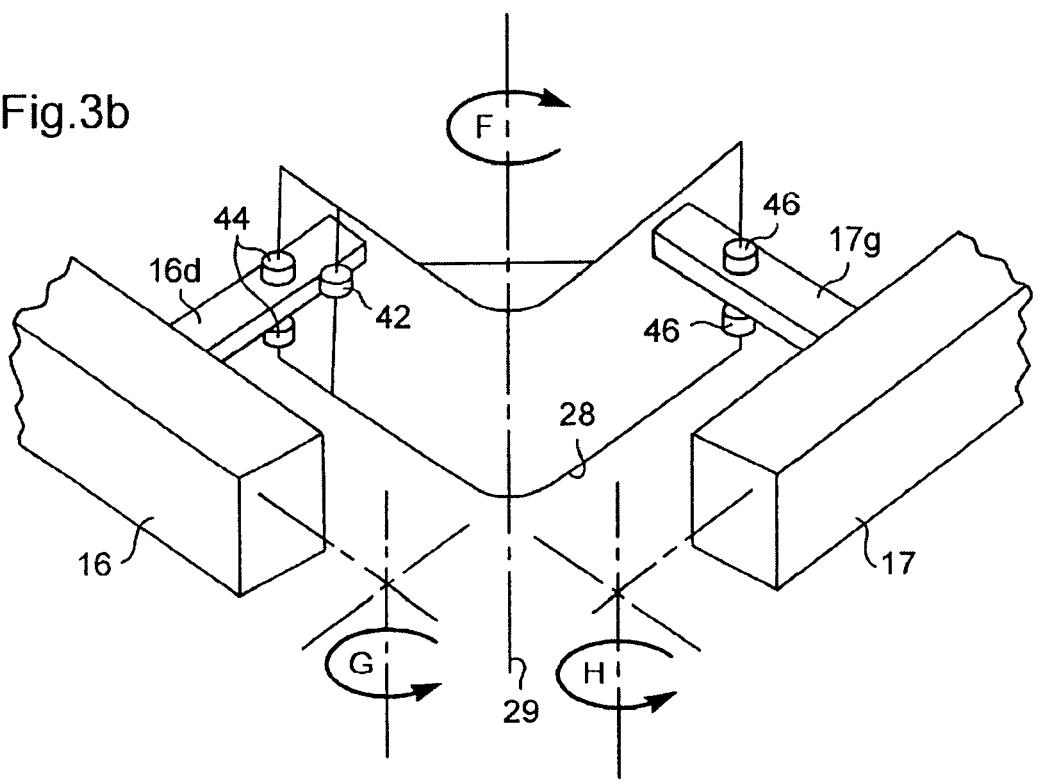
FIG. 3b is a diagrammatic view of the two FIG. 3a sleeve portions in the locked position (sleeves held stationary to enable the blades to be folded)

In order to make the invention understandable, FIGS. 3a and 3b in which the projections 16g and 17d are not shown for simplification purposes, show respectively the lever 28 in the unlocked position (rotor in its flight situation after the lever 28 has turned along arrow J) and in the locked position (for folding purposes) after the wheel 42 has turned, this time in the direction F about the axis 29, entraining in drag e.g. the sleeve 16 following arrow G by action on the right projection 16d until it comes into abutment against a drag abutment secured to the hub 15, thus holding stationary (locking) all of the sleeves in drag, and consequently locking all of the rotor blades by symmetry (turning the sleeve 17 in the direction of arrow H, and likewise for the sleeves 18 and 19).

Under these conditions, each of the left projections 16g to 19g is simultaneously prevented from moving as are the right projections 16d to 19d, respectively between the two corresponding series of abutments 44 and 46, thus ensuring that none of the sleeves can move in pitch (locking them) and consequently ensuring that all of the blades of the rotor are prevented from moving in pitch once folding has been achieved.

As mentioned above, the lever 28 of the actuator 24 is caused to turn about the axis 29 as is required for locking and unlocking the blade-supporting hinged sleeves of the rotor, by causing the motor 30 and the drive mechanism 31 for the lever 28 to turn in a predetermined direction: F for locking purposes; and in the opposite direction J for unlocking purposes.

For this purpose, and with reference to FIG. 2, an outlet gearwheel 39 of the motor 30 rotates a gearwheel 37 by meshing therewith. The gearwheel 37 is secured to a shaft 35 of axis 34 which carries a wormscrew 36 that meshes with another gearwheel 50 secured to the drive shaft 33 of the lever 28 to turn it about the axis 29. It should be observed that this mechanism produces a reduction in speed of rotation relative to the speed of rotation of the motor 30.

When the motor 30 is not powered electrically, vibration from the rotor 10 is transmitted to the rotor of the motor 30 and can lead to "parasitic" (undesirable) rotation of the outlet gearwheel 39 of the motor 30. This undesirable rotation of the motor through a few revolutions could lead to rotation through a few degrees of the lever 28 via the drive mechanism 31 (including the irreversible transmission 36, 50).

In order to prevent this parasitic rotation, two magnets 51, 52 are secured to the flange 38 for mounting the motor 30 on the casing (not shown) of the actuator 24, and two magnets 53, 54 are secured to the face of the gearwheel 37 that faces the flange.

Figure 4A:
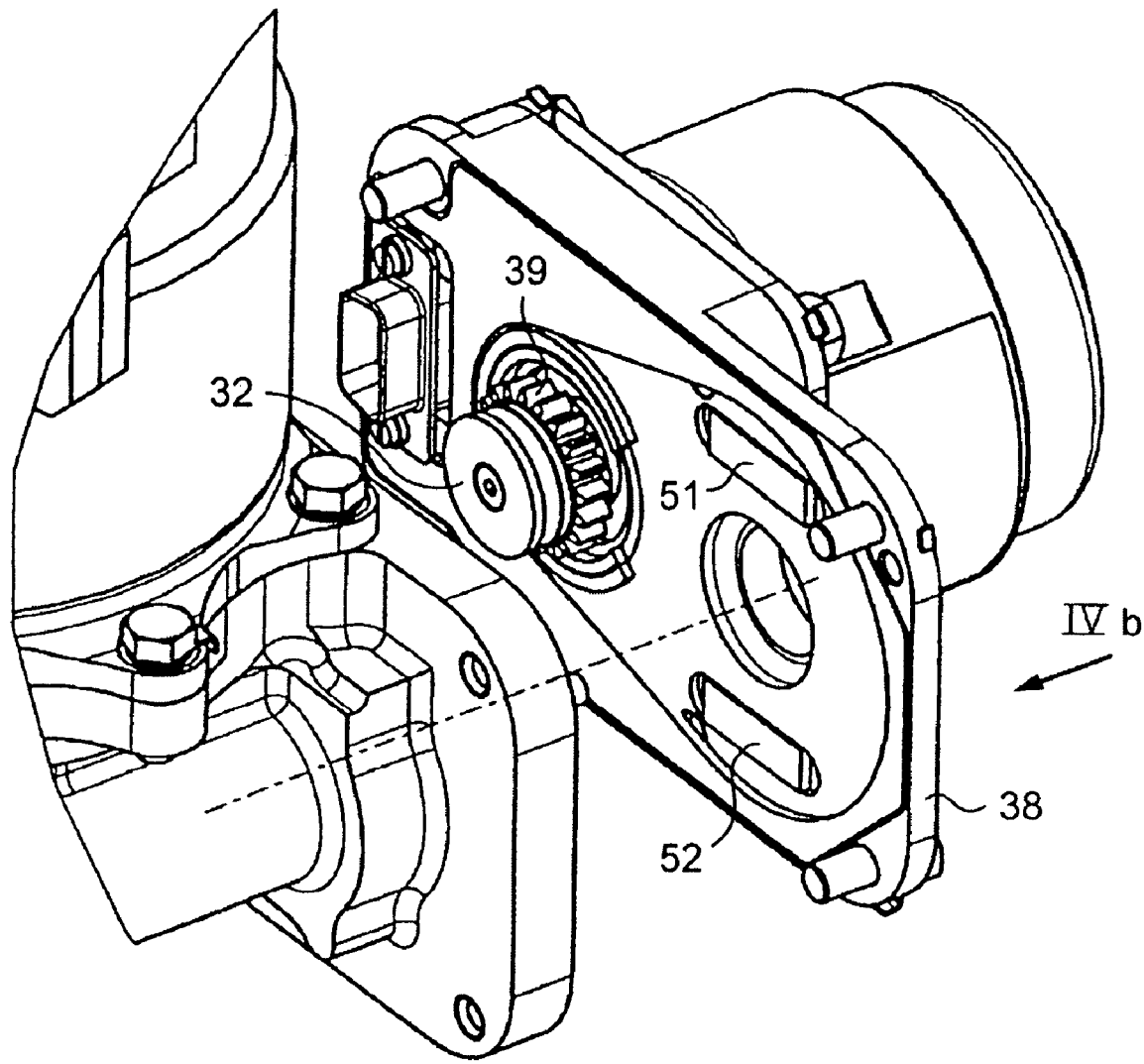
FIG. 4a is an "exploded" perspective view corresponding to looking along arrow IVa of FIG. 4b, showing the electric motor that turns the locking and unlocking lever, and showing the positioning of the brake magnets on an electric motor flange.

In this configuration, as shown by FIGS. 4a and 4b, the magnets 53 and 54 are in diametrically opposite positions about the axis of rotation 34 of the gearwheel 37, and the magnets 51 and 52 are likewise in diametrically opposite positions about said axis. All four of these magnets are located at the same distance from the axis.

In this configuration, the rotary magnet 53 does not face either of the stationary magnets 51 and 52. The same applies to the rotary magnet 54. Consequently, since no force of attraction is exerted by the magnets, there is no torque to prevent parasitic rotation of the gearwheels 37 and 39.

If the gearwheel 37 is turned through one-fourth of a revolution in the clockwise direction, it can be seen from FIGS. 4a and 4b that the magnet 53 will come to face the stationary magnet 52 and that the magnet 54 will come to face the magnet 51. Since the poles of these magnets are placed so that the stationary magnets can attract the moving magnets, it can be understood that the magnets 52 and 53 attract each other in the event of vibration tending to move these magnets apart by uncontrolled rotation of the gearwheel 37. The mutual attraction between the magnets 52 and 53 will generate a return torque on the gearwheel 37 until these two magnets return to the facing position, and the magnitude of this return torque is doubled by the presence of attraction between the other two magnets 51 and 54 when the wheel 37 is in this same position.

Naturally, the magnets are dimensioned so that the total "holding" torque of the magnetic return they exert when facing each other in pairs is much less than the drive torque of the motor 30 when it is powered.

The invention is specifically the result of testing that has shown that when a blade-locking device whose drive mechanism presents an irreversible connection is subjected to vibration, then, under certain conditions, that vibration can cause the blade-locking lever to turn even when no electricity is fed to the lever drive actuator; even though this "parasitic" turning of the lever is of small amplitude, it is nevertheless advantageous to use a device in accordance with the invention in order to prevent any such uncontrolled turning of the locking lever.

The invention thus makes it possible to provide a mechanism for locking and unlocking the sleeves which is effective, lightweight, compact, and easy to implement.

It goes without saying that various additions, omissions, or modifications could be applied by the person skilled in the art to the various embodiments described above, both in terms of structural elements and in terms of functional components, without that going beyond the ambit of the present invention.

What is claimed is:

1. A device for locking a holding structure for securing a foldable blade of a rotorcraft rotor to the hub of said rotor, said holding structure being hinged in pitch and in drag relative to the hub, the rotor also comprising respective locking means associated with each of the blade-holding structures and arranged to be capable of causing the pitch hinge of the blade-holding structure to be locked relative to the hub, and also arranged to be capable of locking the drag hinge of the blade-holding structure relative to the hub, the locking means being suitable for being driven by a rotary electric actuator and a drive mechanism, the device further comprising brake means for the rotary electric actuator or the drive mechanism to prevent said actuator and the drive mechanism from turning under the effect of rotor vibration, in the absence of any electricity being fed to the motor, while allowing the actuator and the drive mechanism to rotate when the actuator is powered, and the drive mechanism of the locking means by the actuator being irreversible.

2. A device according to claim 1, in which the brake means act by the magnetic effect.

3. A device according to claim 2, in which the brake means comprise a first magnet secured to a stationary part of the actuator or of the drive mechanism, and a second magnet secured to a moving part of the actuator or the drive mechanism, the position of the first magnet on the stationary part and the position of the second magnet on the moving part being such that the first and second magnets are capable of coming to face each other during rotation of the actuator, and the polarities of the magnets are such that they attract each other mutually when they are disposed facing each other so as to produce braking torque when they are moved away from said facing position.

4. A device according to claim 3, in which the brake means comprise at least two first magnets secured to a stationary part such as a mounting flange of the actuator, and comprises at least two second magnets secured to a moving part such as a gear for enabling the rotary actuator to drive a lever for locking a sleeve, the moving part extending—at least in part—so as to face the stationary part, the spacing between the first magnets corresponding to the spacing between the second magnets so that the brake torques caused respectively by each of the at least two pairs of magnets are additive.

5. A device according to claim 1, in which the drive mechanism enabling the actuator to drive the locking means includes a speed reducer.

6. A device according to claim 5, in which the speed reducer comprises a wormscrew and a gearwheel.

7. A device according to claim 1, in which the locking means comprises a locking lever arranged to cause said structure to pivot about the drag axis to a drag locking position in which said structure bears against a drag abutment secured to the lever, the lever causing the blade-holding structure (sleeve) simultaneously to pivot about the pitch axis to a pitch locking position in which said structure bears against two pairs of pitch abutments secured to two respective levers.

8. A rotorcraft rotor comprising:
a hub;
a plurality of foldable blades, each blade being secured to the hub by a holding structure, each holding structure including a pitch hinge and a drag hinge such that each holding structure is hinged relative to the hub about a pitch axis and about a drag axis;
a respective locking member associated with each of the holding structures and arranged to be capable of causing the pitch hinge of one of the holding structures to be locked, and also of causing the drag hinge of one of the holding structures to be locked, the locking member being suitable for being driven by a rotary electric actuator via a drive mechanism including an irreversible speed reducer; and
a magnetic brake member for the rotary electric actuator or the drive mechanism to prevent the actuator and the drive mechanism from turning under the effect of rotor vibration in the absence of electricity being fed to the actuator, while enabling the actuator and the drive mechanism to be rotated when the actuator is powered.

9. A rotor according to claim 8, in which the magnetic brake member comprises a first permanent magnet secured to a stationary part of the actuator or the drive mechanism, and a second permanent magnet secured to a moving part of the actuator or the drive mechanism, the position of the first magnet on the stationary part and the position of the second magnet on the moving part being such that the first magnet and the second magnet are capable of coming to face each other during rotation of the actuator, and the polarities of these magnets being such that they attract each other when they are placed facing each other so as to deliver a braking torque when they are moved away from said facing positions, the braking torque being less than the drive torque of the actuator.

10. A rotor according to claim 9, in which the speed reducer is a wormscrew and gearwheel reducer, and in which the locking member includes a pivoting locking lever arranged to cause one of the holding structures to pivot about the drag axis to a drag locking position in which said structure bears against a drag abutment secured to the lever, the lever simultaneously causing one of the holding structures to pivot about the pitch axis to a pitch locking position in which said structure bears against two pairs of pitch abutments respectively secured to two levers.

* * * * *